(12) United States Patent
Kurihara et al.

(10) Patent No.: US 11,104,109 B2
(45) Date of Patent: Aug. 31, 2021

(54) REVERSIBLE RECORDING MEDIUM AND EXTERIOR MEMBER

(71) Applicant: Sony Corporation, Tokyo (JP)

(72) Inventors: Kenichi Kurihara, Kanagawa (JP); Yuki Oishi, Kanagawa (JP); Yuriko Kaino, Kanagawa (JP); Aya Shuto, Kanagawa (JP); Nobukazu Hirai, Kanagawa (JP); Satoko Asaoka, Kanagawa (JP); Isao Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/348,991

(22) PCT Filed: Oct. 5, 2017

(86) PCT No.: PCT/JP2017/036248
§ 371 (c)(1),
(2) Date: May 10, 2019

(87) PCT Pub. No.: WO2018/092455
PCT Pub. Date: May 24, 2018

(65) Prior Publication Data
US 2019/0270290 A1    Sep. 5, 2019

(30) Foreign Application Priority Data
Nov. 18, 2016   (JP) .............................. JP2016-225534

(51) Int. Cl.
*B32B 3/00* (2006.01)
*B32B 27/20* (2006.01)
(Continued)

(52) U.S. Cl.
CPC ................ *B32B 27/20* (2013.01); *B32B 7/02* (2013.01); *B32B 7/027* (2019.01); *B32B 27/18* (2013.01);
(Continued)

(58) Field of Classification Search
CPC ............................... B41M 5/28; B41M 5/305
See application file for complete search history.

(56) References Cited

U.S. PATENT DOCUMENTS

2004/0115404 A1   6/2004 Tsuboi et al.
2006/0276335 A1   12/2006 Tsuboi et al.
(Continued)

FOREIGN PATENT DOCUMENTS

CN    103998955 A    8/2014
EP     1391315 A2    2/2004
(Continued)

OTHER PUBLICATIONS

International Search Report and English translation thereof dated Dec. 26, 2017 in connection with International Application No. PCT/JP2017/036248.
(Continued)

*Primary Examiner* — Elizabeth E Mulvaney
(74) *Attorney, Agent, or Firm* — Wolf, Greenfield & Sacks, P.C.

(57) ABSTRACT

A reversible recording medium according to an embodiment of the present disclosure includes a first layer that reversibly changes between an achromatic state and a transparent state, and a second layer that reversibly changes between a chromatic state and a transparent state.

20 Claims, 7 Drawing Sheets

(51) Int. Cl.
*B32B 7/027* (2019.01)
*B32B 33/00* (2006.01)
*B41M 5/28* (2006.01)
*B41M 5/36* (2006.01)
*B32B 7/02* (2019.01)
*B32B 27/18* (2006.01)

(52) U.S. Cl.
CPC .............. *B32B 33/00* (2013.01); *B41M 5/28* (2013.01); *B41M 5/36* (2013.01)

(56) References Cited

U.S. PATENT DOCUMENTS

| | | | |
|---|---|---|---|
| 2008/0151033 A1 | 6/2008 | Ishimi et al. | |
| 2010/0197492 A1* | 8/2010 | Kawahara | B41J 2/4753 503/201 |
| 2011/0207603 A1* | 8/2011 | Kawahara | B41M 5/305 503/201 |

FOREIGN PATENT DOCUMENTS

| | | |
|---|---|---|
| EP | 1939001 A1 | 7/2008 |
| JP | H02196693 A | 8/1990 |
| JP | H03216378 A | 9/1991 |
| JP | 11-291675 A | 10/1999 |
| JP | 2000348156 A * | 12/2000 |
| JP | 2003-266941 A | 9/2003 |
| JP | 2004-074584 A | 3/2004 |
| JP | 2005-066936 A | 3/2005 |
| JP | 2008-179135 A | 8/2008 |
| JP | 2010-192015 A | 9/2010 |

OTHER PUBLICATIONS

Written Opinion and English translation thereof dated Dec. 26, 2017 in connection with International Application No. PCT/JP2017/036248.

International Preliminary Report on Patentability and English translation thereof dated May 31, 2019 in connection with International Application No. PCT/JP2017/036248.

* cited by examiner

[ FIG. 1 ]
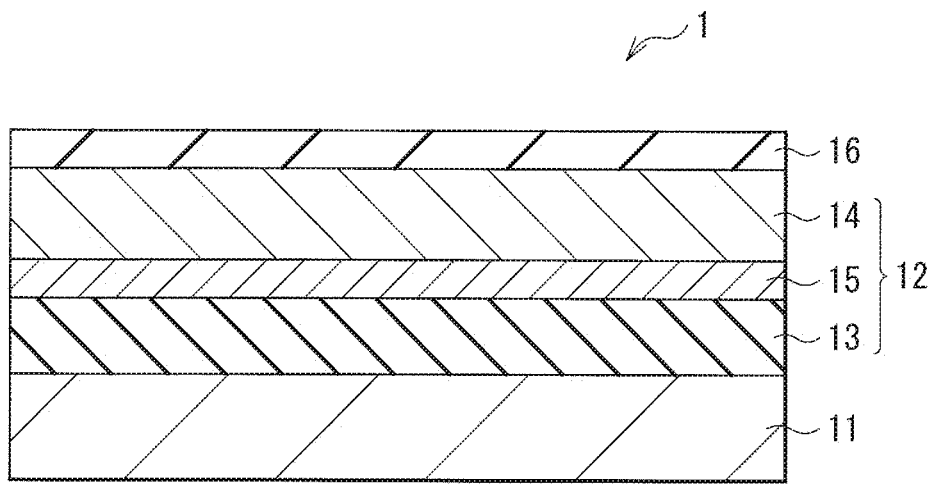
[ FIG. 2 ]
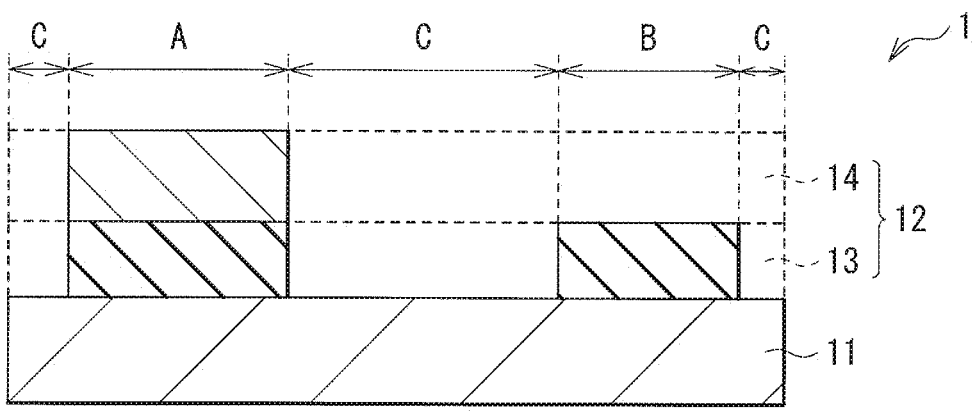

[ FIG. 3 ]
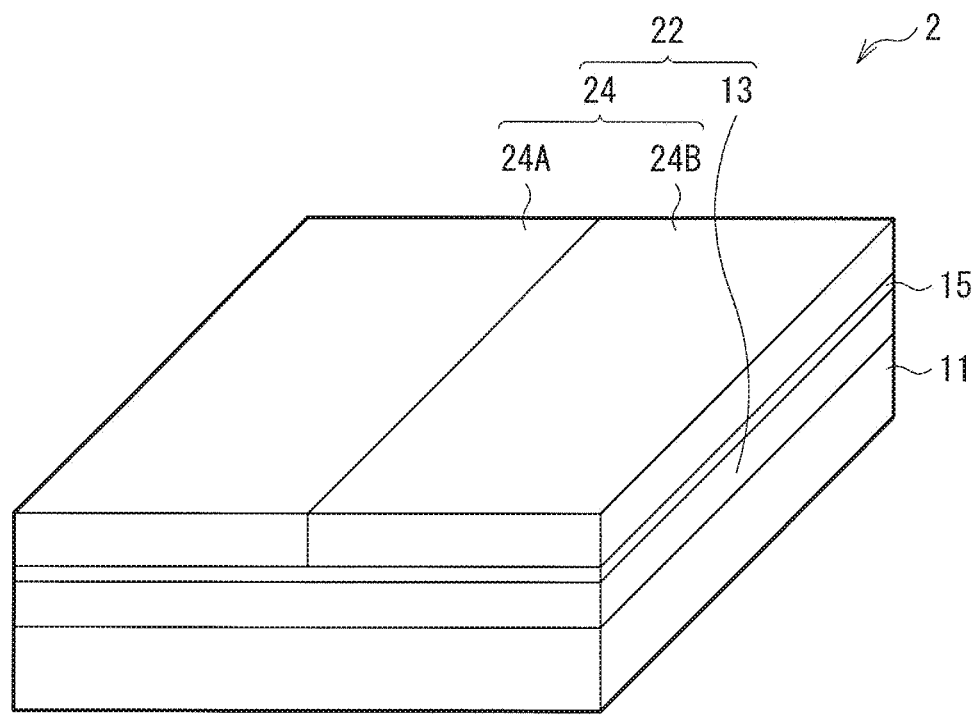
[ FIG. 4 ]
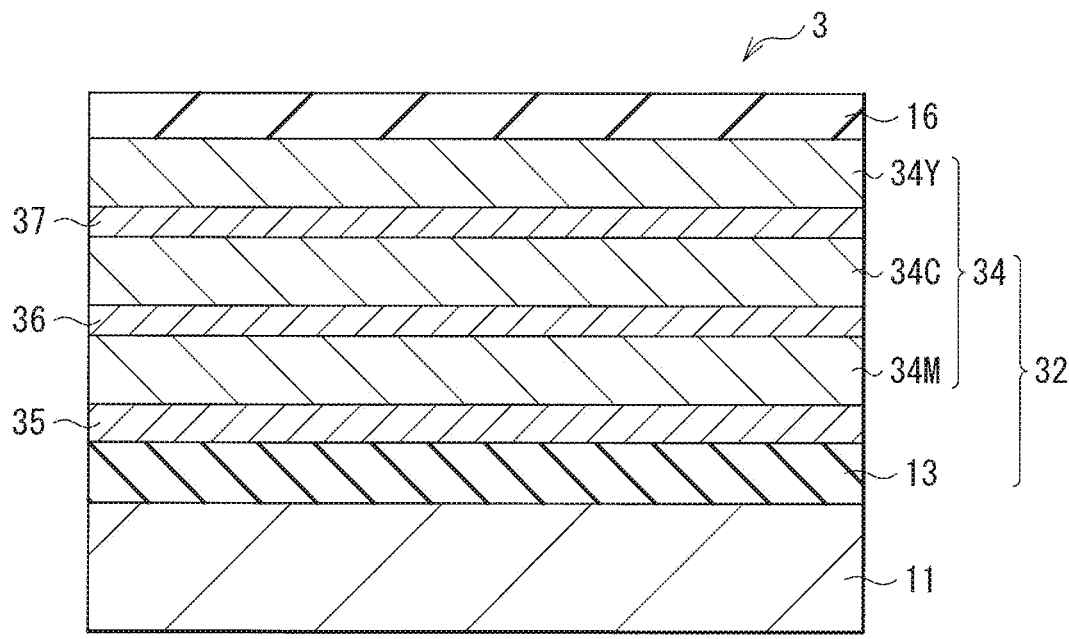

[ FIG. 5 ]
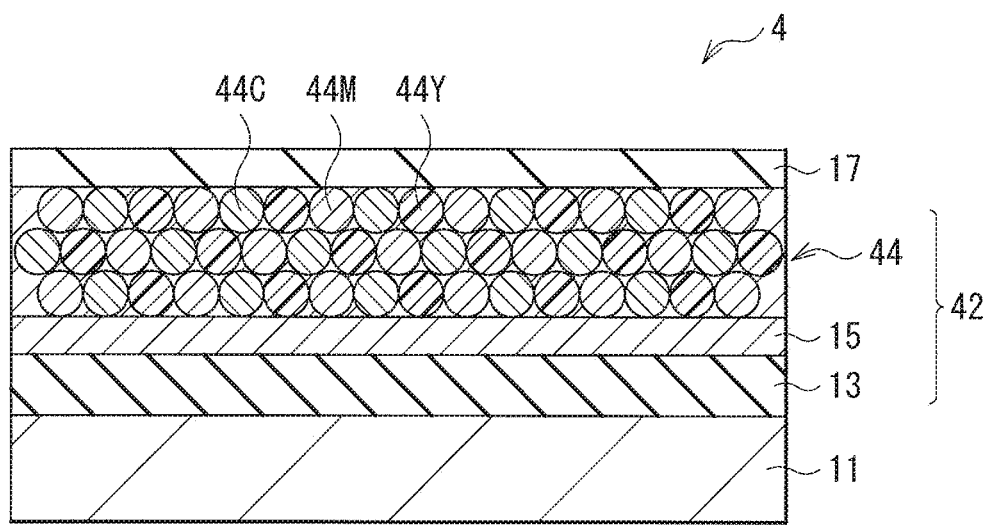

[ FIG. 6A ]
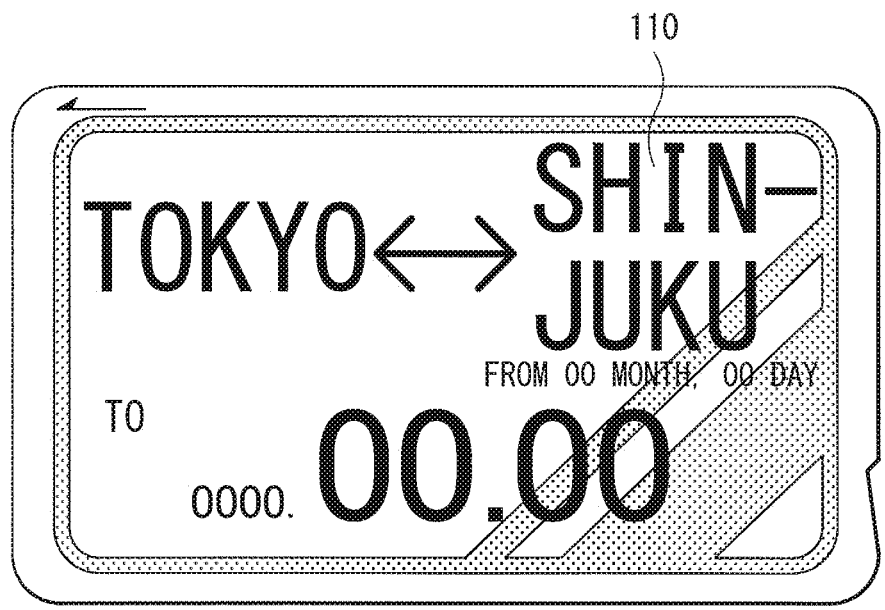
[ FIG. 6B ]
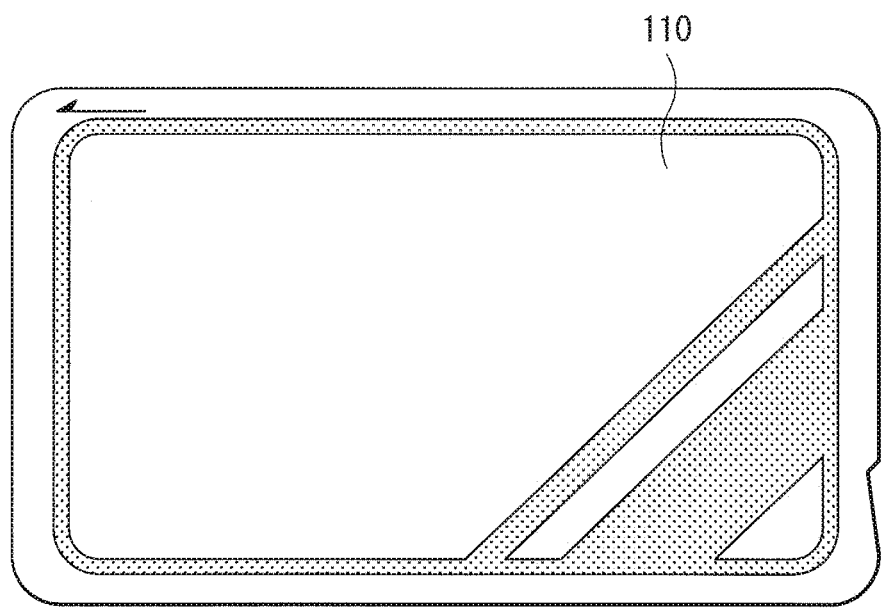

[ FIG. 7A ]
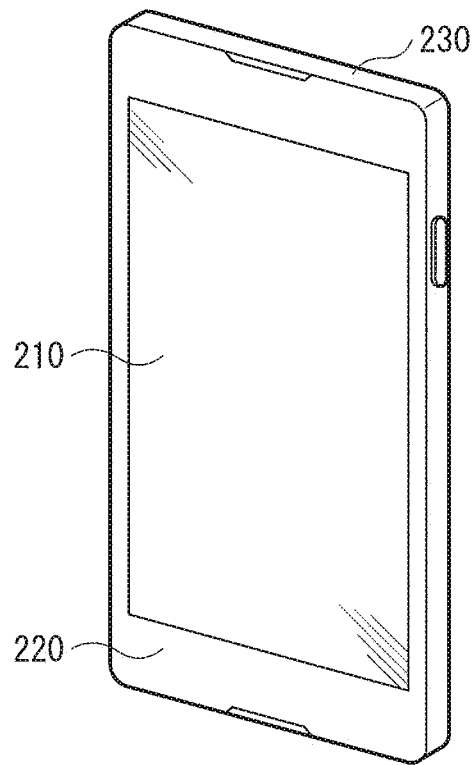
[ FIG. 7B ]
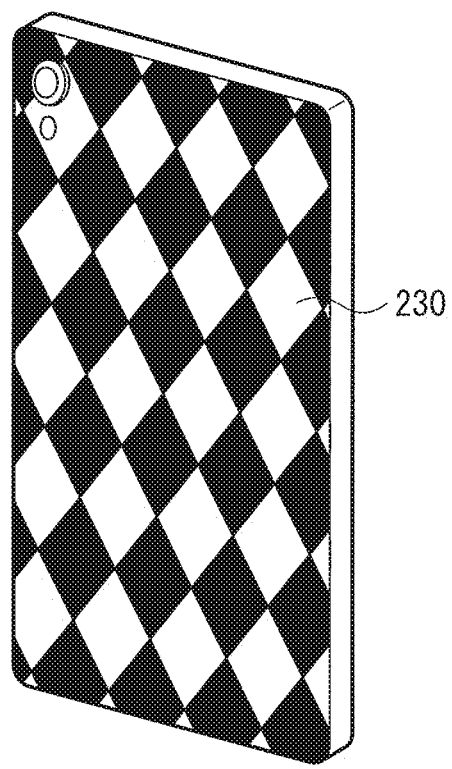

[ FIG. 8A ]
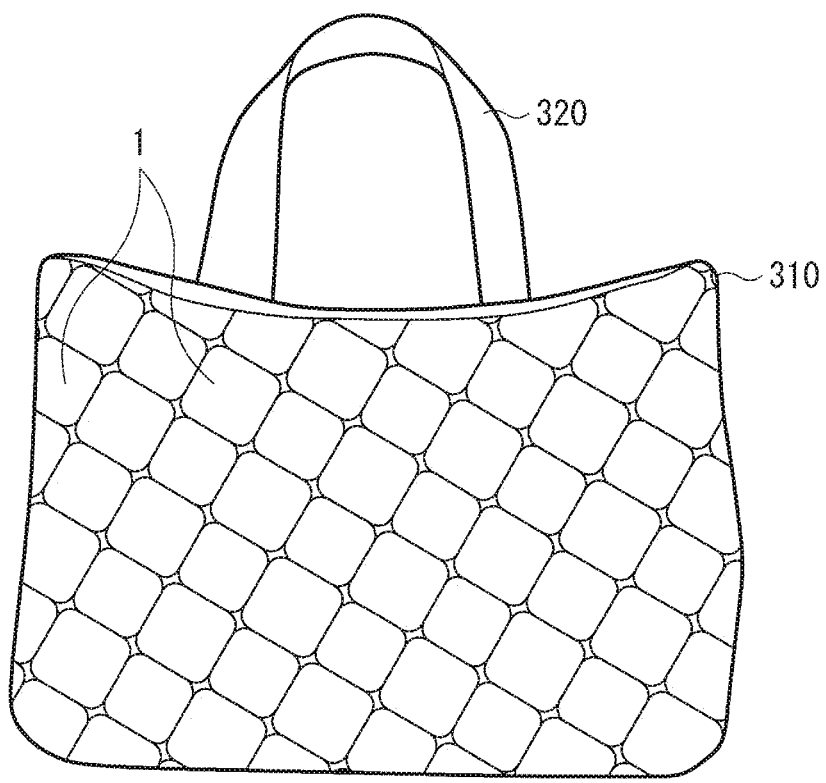
[ FIG. 8B ]

[FIG. 9]
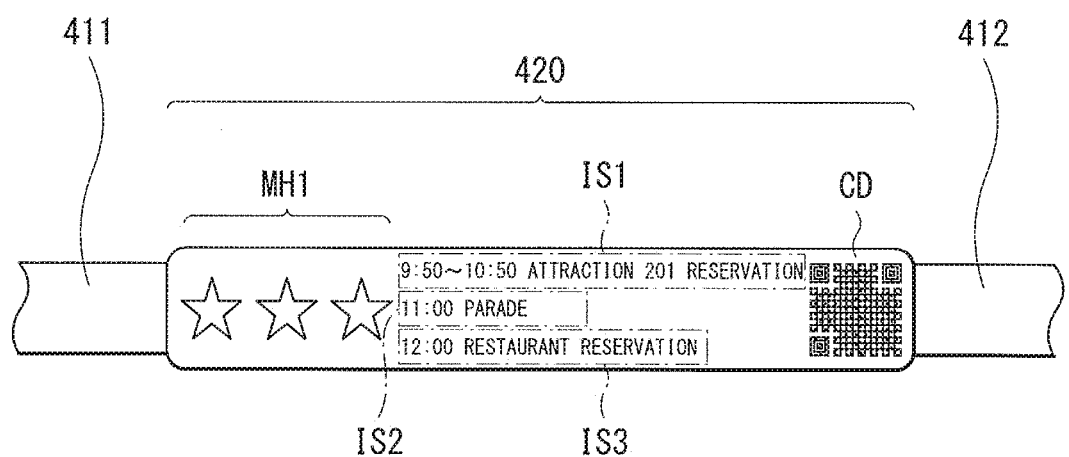

REVERSIBLE RECORDING MEDIUM AND EXTERIOR MEMBER

CROSS-REFERENCE TO RELATED APPLICATIONS

This application claims the benefit under 35 U.S.C. § 371 as a U.S. National Stage Entry of International Application No. PCT/JP2017/036248, filed in the Japanese Patent Office as a Receiving Office on Oct. 5, 2017, which claims priority to Japanese Patent Application Number JP 2016-225534, filed in the Japanese Patent Office on Nov. 18, 2016, each of which is hereby incorporated by reference in its entirety.

TECHNICAL FIELD

The present disclosure relates to a reversible recording medium that allows for recording and deletion of, for example, an image, and an exterior member provided therewith.

BACKGROUND ART

In a reversible recording layer using a leuco pigment, reversible change is performed between a colorless transparent state and a colored transparent state. However, there is no leuco pigment that enables display of a white color. For this reason, PTL 1 discloses a reversible multicolor recording medium provided with a white reflective layer between a support substrate and a recording layer. In this manner, the provision of the white reflective layer below the recording layer allows the reversible recording medium using the leuco pigment to perform white color display.

CITATION LIST

Patent Literature

PTL 1: Japanese Unexamined Patent Application Publication No. 2004-74584

SUMMARY OF THE INVENTION

However, a case of providing a reversible recording layer on a base material in a color other than a white color is conceivable depending on applications. In such a case, there is a possibility that a color gamut may be limited depending on the color of the base material. Accordingly, it has been desired to develop a reversible recording medium that makes it possible to widen a displayable color gamut.

It is desirable to provide a reversible recording medium and an exterior member that make it possible to widen a displayable color gamut.

A reversible recording medium according to an embodiment of the present disclosure includes a first layer that reversibly changes between an achromatic state and a transparent state, and a second layer that reversibly changes between a chromatic state and a transparent state.

An exterior member according to an embodiment of the present disclosure has at least one surface, of a support base material, that is provided with the above-described reversible recording medium according to an embodiment of the present disclosure.

In the reversible recording medium and the exterior member according to respective embodiments of the present disclosure, the first layer that reversibly changes between an achromatic state and a transparent state and the second layer that reversibly changes between a chromatic state and a transparent state are provided. This makes it possible to suppress influences of base materials that form the first layer and the second layer on color development.

According to the reversible recording medium and the exterior member of the respective embodiments of the present disclosure, providing the first layer that reversibly changes between an achromatic state and a transparent state, in addition to the second layer that reversibly changes between a chromatic state and a transparent state, makes it possible to suppress the influences of the base materials on color development and thus to widen a displayable color gamut.

It is to be noted that the effects described here are not necessarily limitative, and may be any of the effects described in the present disclosure.

BRIEF DESCRIPTION OF DRAWINGS

FIG. 1 is a cross-sectional view of an example of a configuration of a reversible recording medium according to a first embodiment of the present disclosure.

FIG. 2 is an explanatory schematic view of a display mode in the reversible recording medium illustrated in FIG. 1.

FIG. 3 is a perspective view of an example of a configuration of a reversible recording medium according to Modification Example 1 of the present disclosure.

FIG. 4 is a cross-sectional view of an example of a configuration of a reversible recording medium according to a second embodiment of the present disclosure.

FIG. 5 is a cross-sectional view of an example of a configuration of a reversible recording medium according to Modification Example 2 of the present disclosure.

FIG. 6A is a perspective view of an example of an appearance of Application Example 1.

FIG. 6B is a perspective view of another example of the appearance of Application Example 1.

FIG. 7A is a perspective view of an example of an appearance (on front side) of Application Example 2.

FIG. 7B is a perspective view of an example of an appearance (on rear side) of Application Example 2.

FIG. 8A is a perspective view of an example of an appearance of Application Example 3.

FIG. 8B is a perspective view of another example of the appearance of Application Example 3.

FIG. 9 is an explanatory diagram illustrating a configuration example of Application Example 4.

MODES FOR CARRYING OUT THE INVENTION

In the following, some embodiments of the present disclosure are described in detail with reference to the drawings. It is to be noted that the following description is directed to specific examples of the present disclosure, and the present disclosure is not limited to the following embodiments. The description is given in the following order.

1. First Embodiment (An example of a reversible recording medium including two respective layers that enable display of a white color and other colors in a color-developed state)
   1-1. Configuration of Reversible Recording Medium
   1-2. Manufacturing Method of Reversible Recording Medium
   1-3. Recording and Deletion Methods of Reversible Recording Medium
   1-4. Workings and Effects 2. Modification Example 1 (An example of a reversible recording medium in which two layers are arranged side by side that enable display of other colors in a color-developed state)
3. Second Embodiment (An example in which a plurality of layers are stacked that enable display of other colors in a color-developed state)
   3-1. Configuration of Reversible Recording Medium
   3-2. Recording and Deletion Methods of Reversible Recording Medium
   3-3. Workings and Effects
4. Modification Example 2 (An example of a reversible recording medium that enables multicolor display using a single-layer recording layer)
5. Application Examples
6. Working Examples

1. First Embodiment

FIG. 1 illustrates a cross-sectional configuration of a reversible recording medium (a reversible recording medium 1) according to a first embodiment of the present disclosure. The reversible recording medium 1 includes, for example, a recording layer 12 that is disposed on a support base 11 and allows for reversible change between a recorded state and a deleted state. In the present embodiment, the recording layer 12 has a configuration in which two layers (a first layer 13 and a second layer 14) are stacked. The first layer 13 and the second layer 14 are stacked in this order with a heat-insulating layer 15 being interposed therebetween. The first layer 13 is a recording layer that allows for reversible change between an achromatic state and a transparent state, and the second layer 14 is a recording layer that allows for reversible change between a chromatic state and a transparent state. It is to be noted that FIG. 1 schematically illustrates a cross-sectional configuration of the reversible recording medium 1 and that the size and shape thereof may be different from the actual size and shape thereof in some cases.

(1-1. Configuration of Reversible Recording Medium)

The support base 11 serves to support the recording layer 12. The support base 11 is configured by a material having superior heat resistance as well as superior size stability in a planar direction. The support base 11 may have a property of either light-transmissivity or non-light transmissivity. For example, the support base 11 either may be a substrate having rigidity, such as a wafer, or may be configured by flexible thin layer glass, film, paper, or the like. The use of a flexible substrate as the support base 11 allows for achievement of a flexible (foldable) reversible recording medium.

Examples of a constituent material of the support base 11 include an inorganic material, a metal material, and a macromolecular material such as plastic. Specific examples of the inorganic material include silicon (Si), silicon oxide ($SiO_x$), silicon nitride ($SiN_x$), and aluminum oxide ($AlO_x$). Examples of silicon oxide include glass and spin-on-glass (SOG). Examples of the metal material include aluminum (Al), nickel (Ni), and stainless steel. Examples of the macromolecular material include polycarbonate (PC), polyethylene terephthalate (PET), polyethylene naphthalate (PEN) or polyethyl ether ketone (PEEK), polyvinyl chloride (PVC), and copolymers thereof.

As described above, the recording layer 12 has a configuration in which the first layer 13 and the second layer 14 are stacked in this order from side of the support base 11, with the heat-insulating layer 15 being interposed therebetween. The first layer 13 and the second layer 14 each enable information to be reversibly recorded and deleted by heat. The first layer 13 reversibly changes between an achromatic state (color-developed state, recorded state) and a transparent state (decolored state, deleted state), and is preferably colored in a white color or a color close to white. The second layer 14 reversibly changes between a chromatic state (recorded state) and a transparent state (deleted state). The first layer 13 and the second layer 14 are each configured by a material that allows for stable repeated recording and is able to control a decolored state and a color-developed state. For example, the first layer 13 is configured by a low molecular material and a macromolecular material. The second layer 14 includes a coloring compound, a color developing/quenching agent, and a photothermal conversion material, and is formed, for example, by a macromolecular material.

The first layer 13 is colored in a white color in a color-developed state. The first layer 13 serves as a reflective layer having an optical reflectance of 30% or higher, for example, in the state of being colored in a white color. Further, the first layer 13 has an optical reflectance of 70% or higher, for example, in a transparent state. The first layer 13 turns into a white layer (reflective layer) in a color-developed state to thereby suppress an influence of the support base 11 on color development, thus making it possible to widen a color gamut displayable by the second layer 14. The first layer 13 has a film thickness (hereinafter, simply referred to as thickness), in a stacking direction, in a range from 7 μm to 30 μm, for example.

For example, it is preferable to use, as the low molecular material to be used for the first layer 13, an organic low molecular compound having a molecular weight in a range from 150 to 700; examples thereof include a long chain low molecular compound such as a fatty acid. Specific examples thereof include behenic acid, lignoceric acid, and eicosane diacid. Among these, it is desirable to use, in combination, a higher fatty acid having a low melting point (e.g., behenic acid) and a dibasic acid having a high melting point (e.g., eicosane diacid). One reason for this is that the use of the long chain low molecular compounds having different melting points in combination makes it possible to enlarge a temperature range for transparentization and thus to enhance speed of a deleting treatment.

The photothermal conversion material to be used for the first layer 13 absorbs light in a specific wavelength region (e.g., a near infrared region) to generate heat. It is preferable to use, as the photothermal conversion material, a near infrared-absorbing pigment that has an absorption peak in a wavelength in a range from 700 nm to 2,000 nm and hardly has an absorption in a visible region. Specific examples thereof include a compound having a phthalocyanine skeleton (a phthalocyanine-based dye), a compound having a squarylium skeleton (a squarylium-based dye), and an inorganic compound. Examples of the inorganic compound include a metal complex such as a dithio complex, a diimmonium salt, an aminium salt, and an inorganic compound. Examples of the inorganic compound include metal oxides such as graphite, carbon black, metal powder particles, tricobalt tetroxide, iron oxide, chromium oxide, copper oxide, titanium black and ITO, metal nitrides such as niobium nitride, metal carbides such as tantalum carbide, metal sulfides, and various magnetic powders. Aside from those described above, a compound having a cyanine skeleton (a cyanine-based dye) with superior light resistance and superior heat resistance may be used. As used herein, the superior light resistance refers to not dissolving during laser irradiation. The superior heat resistance means that a change equal to or more than 20% does not occur to a maximum absorption peak value of an absorption spectrum when being formed as a film together with a macromolecular material, for example, and being stored at 150° C. for 30 minutes, for example. Examples of such a compound having a cyanine skeleton include a compound containing, in a molecule, one or both of a counter ion of one of $SbF_6$, $PF_6$, $BF_4$, $ClO_4$, $CF_3SO_3$ and $(CF_3SO_3)_2N$ and a methine chain containing a five-membered ring or a six-membered ring. It is to be noted that, although the compound having a cyanine skeleton to be used for the reversible recording medium of the present embodiment is preferably provided with both of one of the above-mentioned counter ions and the ring structure such as a five-membered ring and a six-membered ring in a methine chain, the provision of at least one of those allows sufficient light resistance and heat resistance to be secured.

As the macromolecular material to be used for the first layer 13, it is preferable to adopt a material in which the low molecular material and the photothermal conversion material are easily dispersed evenly. It is preferable to use, as the macromolecular material, a macromolecular matrix material such as a thermosetting resin and a thermoplastic resin. Specific examples thereof include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, a copolymer of vinyl chloride and vinyl acetate, an acrylic-based copolymer, a maleic acid-based polymer, polyvinyl alcohol, modified polyvinyl alcohol, hydroxy ethyl cellulose, carboxymethyl cellulose, and starch.

The first layer 13 includes at least one of the coloring compounds, at least one of the color developing/quenching agents, and at least one of the photothermal conversion materials. Further, the first layer 13 may include, in addition to the above-mentioned materials, various additives such as a curing agent, a sensitizer, and an ultraviolet absorbing agent, for example.

The second layer 14 is colored in a chromatic color, e.g., a magenta color, a cyan color, or a yellow color to be mentioned in a second embodiment described below, in a color-developed state. The second layer 14 has a thickness in a range from 1 μm to 10 μm, for example.

Examples of the coloring compound to be used for the second layer 14 include a leuco pigment. Examples of the leuco pigment include existing dye for heat-sensitive paper. A specific example thereof includes a compound that contains, in a molecule, a group having an electron-donating property and is represented by the following formula (1).

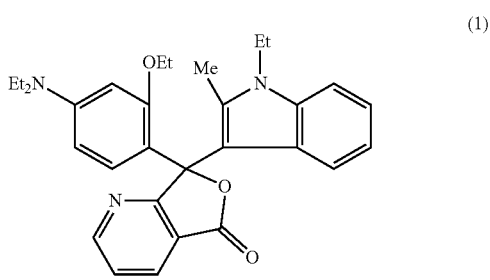

The color developing/quenching agent to be used for the second layer 14 serves, for example, to develop a color of a colorless coloring compound or to decolor a coloring compound colored in a predetermined color. Examples of the color developing/quenching agent include a phenol derivative, a salicylic acid derivative, and a urea derivative. Specific examples thereof include a compound having a salicylic acid skeleton represented by the following general formula (2) and containing, in a molecule, a group having an electron-accepting property.

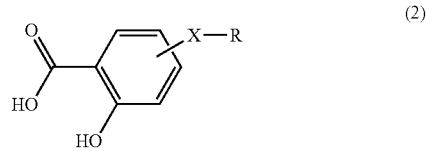

(X is one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—. R is a linear hydrocarbon group having 25 to 34 carbon atoms.)

The photothermal conversion material to be used for the second layer 14, for example, absorbs light in a specific wavelength region of a near infrared region to generate heat. It is preferable to use, as the photothermal conversion material, for example, a near infrared-absorbing pigment that has an absorption peak in a wavelength in a range from 700 nm to 2,000 nm and hardly has an absorption in a visible region; a material similar to that for the above-described first layer 13 may be used. Specific examples thereof include a compound having a phthalocyanine skeleton (a phthalocyanine-based dye), a compound having a squarylium skeleton (a squarylium-based dye), and an inorganic compound. Examples of the inorganic compound include a metal complex such as a dithio complex, a diimmonium salt, an aminium salt, and an inorganic compound. Examples of the inorganic compound include metal oxides such as graphite, carbon black, metal powder particles, tricobalt tetroxide, iron oxide, chromium oxide, copper oxide, titanium black and ITO, metal nitrides such as niobium nitride, metal carbides such as tantalum carbide, metal sulfides, and various magnetic powders. Aside from those described above, a compound having a cyanine skeleton (a cyanine-based dye) may be used, which contains, in a molecule, one or both of a counter ion of one of $SbF_6$, $PF_6$, $BF_4$, $ClO_4$, $CF_3SO_3$ and $(CF_3SO_3)_2N$ and a methine chain containing a five-membered ring or a six-membered ring. It is to be noted that the photothermal conversion materials to be used for the first layer 13 and the second layer 14 have absorption peaks in different wavelength ranges; it is preferable to have an absorption peak on longer wavelength side as being closer to an underlayer (a layer closer to the support base 11).

Similarly to the macromolecular material in the above-described first layer 13, it is preferable to adopt, as the macromolecular material to be used for the second layer 14, a material in which the coloring compound, the color developing/quenching agent, and the photothermal conversion material are easily dispersed evenly. Examples of the macromolecular material include a thermosetting resin and a thermoplastic resin. Specific examples thereof include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, polyvinyl alcohol, modified polyvinyl alcohol, hydroxy ethyl cellulose, carboxymethyl cellulose, and starch.

The second layer 14 includes at least one of the coloring compounds, at least one of the color developing/quenching agents, and at least one of the photothermal conversion materials. The second layer 14 may include, in addition to the above-mentioned materials, various additives such as a sensitizer and an ultraviolet absorbing agent, for example.

The heat-insulating layer 15 is configured, for example, using a typical macromolecular material having translucency. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, polyvinyl alcohol, modified polyvinyl alcohol, hydroxy ethyl cellulose, carboxymethyl cellulose, and starch. It is to be noted that the heat-insulating layer 15 may include various additives such as an ultraviolet absorbing agent, for example.

Further, the heat-insulating layer 15 may be formed using an inorganic material having translucency. For example, use of porous silica, porous alumina, porous titania, porous carbon, a composite thereof, or the like brings preferable effects such as lower thermal conductivity as well as a higher heat-insulating effect. The heat-insulating layer 15 may be formed by a sol-gel method, for example.

The heat-insulating layer 15 has a thickness preferably in a range from 3 μm to 100 μm, for example, and more preferably in a range from 5 μm to 50 μm, for example. One reason for this is that, when the heat-insulating layer 15 has a too small thickness, a sufficient heat-insulating effect is not obtained, and, when having a too large thickness, thermal conductivity is deteriorated and translucency is lowered upon uniformly heating the entire reversible recording medium 2.

It is preferable to form a protective layer 16, for example, on the recording layer 12 (specifically, the second layer 14). The protective layer 16 serves to protect a surface of the recording layer 12, and is formed using an ultraviolet curable resin or a thermosetting resin, for example. The protective layer 16 has a thickness in a range from 0.1 μm to 20 μm, for example.

(1-2. Manufacturing Method of Reversible Recording Medium)

The reversible recording medium 1 according to the present embodiment may be manufactured using an application method, for example. It is to be noted that the manufacturing method described below is merely exemplary; any other method may be used for the manufacture.

First, for example, a vinyl chloride/vinyl acetate copolymer is dissolved as a macromolecular material into a solvent (e.g., methyl ethyl ketone). Behenic acid and eicosane diacid as low molecular materials, the photothermal conversion material, and an isocyanate compound as a curing agent are added to the solution, and are dispersed therein to prepare a reversible recording medium coating A. Subsequently, the reversible recording medium coating A is applied onto the support base 11 to have a thickness of 10 μm, for example, and is dried at 65° C., for example. This allows for formation of the first layer 13.

Subsequently, an aqueous polyvinyl alcohol solution, for example, is applied onto the first layer 13 to have a thickness of 20 μm, for example, and thereafter is dried to form the heat-insulating layer 15.

Next, for example, a vinyl chloride/vinyl acetate copolymer is dissolved as a macromolecular material into a solvent (e.g., methyl ethyl ketone). A coloring compound (e.g., a leuco pigment), a color developing/quenching agent (e.g., a salicylic acid derivative), and a photothermal conversion material (e.g., a cyanine-based dye) are added to the solution, and are dispersed therein to prepare a reversible recording medium coating B. Subsequently, the reversible recording medium coating B is applied onto the support base 11 to have a thickness of 3 μm, for example, and is dried at 70° C., for example, to form the second layer 14.

Subsequently, an acrylic resin, for example, is applied onto the second layer 14 to have a thickness of 10 μm, for example, and thereafter is dried to form the protective layer 16. The above allows for completion of the reversible recording medium 1 illustrated in FIG. 1.

It is to be noted that a method other than the above-described application may be used to form the recording layer 12. For example, a film obtained by application to another base material beforehand may be adhered onto the support base 11 via an adhesive film, for example, to form the recording layer 12. Alternatively, the support base 11 may be immersed in the coating to form the recording layer 12.

(1-3. Recording and Deletion Methods of Reversible Recording Medium)

In the reversible recording medium 1, recording and deletion may be performed as follows, for example.

First, the recording layer 12 is heated at a temperature enough to decolor a coloring compound to cause the recording layer 12 to be in a decolored state in advance. Next, a desired position of the recording layer 12 is irradiated with a near infrared ray having a wavelength and an output that are adjusted using, for example, a semiconductor laser, etc. This allows for heat generation of the photothermal conversion material included in the recording layer 12, causing a coloring reaction (chromogenic reaction) between the coloring compound and the color developing/quenching agent, thus allowing the irradiated part to develop a color.

Meanwhile, in a case where a color-developed part is decolored, irradiation is performed with a near infrared ray at energy enough to cause the color-developed part to reach a decoloring temperature. This allows for heat generation of the photothermal conversion material included in the recording layer 12, causing a decoloring reaction between the coloring compound and the color developing/quenching agent, thus allowing the irradiated part to be decolored and leading to deletion of a record. Further, in a case of deleting all of records formed in the recording layer 12 all at once, the reversible recording medium 1 is heated at a temperature enough to perform decoloring. This allows information recorded in the recording layer 12 to be deleted all at once. Thereafter, the above-described operation is performed, thus enabling repeated recording into the recording layer 12.

The reversible recording medium 1 of the present embodiment is heated at a temperature (e.g., 120° C.) enough to decolor the coloring compounds included in the first layer 13 and the second layer 14 to be brought into a decolored state in advance. In this decolored state, for example, a desired position is irradiated with laser light that causes only the first layer 13 to develop a color, e.g., laser light (e.g., an output of 3 W) of a wavelength of 980 nm to be absorbed by the photothermal conversion material included in the first layer 13. This causes the photothermal conversion material included in the first layer 13 to generate heat, thus causing a coloring reaction (chromogenic reaction) between the coloring compound and the color developing/quenching agent included in the first layer 13. This allows for display of a color (white color) of the first layer 13 on the irradiated part (see a region B in FIG. 2). Further, although not illustrated in FIG. 2, irradiation with laser light (e.g., an output of 3 W) of a wavelength of 890 nm, for example, allows for heat generation of the photothermal conversion material included in the second layer 14, thus enabling only the second layer 14 to develop a color. As indicated by a region A, in a case of causing both the first layer 13 and the second layer 14 to develop a color, irradiation is performed with laser light of each of wavelengths of 980 nm and 890 nm.

As described above, the irradiation of the recording layer 12 through adjustment of a wavelength and an output of a near infrared ray enables colored display (region A), white color display (region B), and display of a color of the support base 11 (region C), as illustrated in FIG. 2. It is to be noted that FIG. 2 omits the heat-insulating layer 15 and the protective layer 16.

It is to be noted that the color-developed state and the decolored state are kept insofar as the above-described chromogenic reaction and decoloring reaction such as the near infrared irradiation and the heating are not performed.
(1-4. Workings and Effects)

As described above, a reversible recording medium using a leuco pigment is typically provided with a white reflective layer between a support substrate and a recording layer, because of no presence of leuco pigment that enables white color display. For example, white color display is performed in reward cards, etc. by using a white base material and by bringing the recording layer into a transparent state, without forming a reflective layer. In the application of reward cards, etc., the selection of a white base material in this manner enables the white color display as well as display of a color hue with favorable visibility (e.g., blue, black, etc.).

However, there is a case where a base material in a color other than a white color may be used, depending on applications. In such a case, it is difficult to reproduce an original color tone of the leuco pigment; further there occurs an issue of being unable to perform white color display.

In contrast, the reversible recording medium 1 of the present embodiment is provided with the first layer 13 that allows for reversible change between an achromatic state and a transparent state and with the second layer 14 that allows for reversible change between a chromatic state and a transparent state, and the layers are stacked to configure the recording layer 12. Accordingly, for example, in a case where a white color is adopted as the displaying color of the first layer, color development of the first layer 13 and decoloring of the second layer 14 enable white color display. Further, color development of the first layer 13 together with the second layer 14 causes the first layer 13 to serve as a reflective layer, thus making it possible to display a color of the coloring compound included in the second layer 14 without being influenced by a color of the base material. In other words, color reproducibility is enhanced.

As described above, in the reversible recording medium 1 of the present embodiment, the recording layer 12 is configured by the first layer 13 that allows for reversible change between an achromatic state and a transparent state and the second layer 14 that allows for reversible change between a chromatic state and a transparent state, with the first layer 13 and the second layer 14 being stacked. This enables white color display, for example, regardless of the color of the support base 11, thus enhancing color reproducibility. Further, decoloring of each of the first layer 13 and the second layer 14 also enables display of a color of the support base 11 itself. Hence, it becomes possible to provide a reversible recording medium having a wide displayable color gamut.

Next, description is given of a second embodiment and Modification Examples 1 and 2 of the present disclosure. In the following, components similar to those of the foregoing first embodiment are denoted by the same reference numerals, and descriptions thereof are omitted where appropriate.

2. Modification Example 1

FIG. 3 illustrates, in a perspective manner, a configuration of a reversible recording medium (a reversible recording medium 2) according to a modification example of the present disclosure. Similarly to the foregoing first embodiment, the reversible recording medium 2 has a configuration in which the first layer 13 that allows for reversible change between an achromatic state and a transparent state and a second layer 24 that allows for reversible change between a chromatic state and a transparent state are stacked on the support base 11 in this order, as a recording layer 22, with the heat-insulating layer 15 being interposed therebetween. The present modification example differs from the foregoing first embodiment in that the second layer 24 includes, for example, two layers 24A and 24B to be colored in different colors and that the layers 24A and 24B are disposed side by side on the heat-insulating layer 15. It is to be noted that FIG. 3 schematically illustrates the configuration of the reversible recording medium 2 and that the size and shape thereof may be different from the actual size and shape thereof in some cases. In addition, FIG. 3 omits the protective layer 16.

In this manner, a plurality of layers (the two layers 24A and 24B in this example) including coloring compounds to be colored in different colors are formed as the second layer 24, and the layers are disposed side by side, for example. This makes it possible to provide a reversible recording medium that enables multicolor display in addition to the effects of the foregoing first embodiment.

3. Second Embodiment

FIG. 4 illustrates a cross-sectional configuration of a reversible recording medium (a reversible recording medium 3) according to a second embodiment of the present disclosure. Similarly to the foregoing first embodiment, the reversible recording medium 3 includes a recording layer 32 in which the first layer 13 that allows for reversible change between an achromatic state and a transparent state and a second layer 34 that allows for reversible change between a chromatic state and a transparent state are stacked on the support base 11. In the present embodiment, the second layer 34 has a configuration in which a plurality of layers (three layers 34M, 34C, and 34Y in this example) to be colored in different colors in color-developed states are stacked. It is to be noted that FIG. 4 schematically illustrates the cross-sectional configuration of the reversible recording medium 3 and that the size and shape thereof may be different from the actual size and shape thereof in some cases.
(3-1. Configuration of Reversible Recording Medium)

As described above, in the reversible recording medium 3 of the present embodiment, the second layer 34 has a configuration in which the three layers 34M, 34c, and 34Y are stacked in this order, for example, from side of the first layer 13. Heat-insulating layers 35, 35, and 37 are provided, respectively, between the first layer 13 and the layer 34M, between the layer 34M and the layer 34C, and between the layer 34C and the layer 34Y.

The layers 34M, 34C, and 34Y include respective coloring compounds, color developing/quenching agents corresponding to the respective coloring compounds, and photothermal conversion materials that absorb light in predetermined wavelength regions, for example, to generate heat; the layers 34M, 34C, and 34Y are each formed by a macromolecular material, for example. As described above, the color developing/quenching agent serves, for example, to develop a color of a colorless coloring compound or to decolor a coloring compound colored in a predetermined color; respective color developing/quenching agents to be colored in different colors are used for the layers 34M, 34C, and 34Y. As described above, the color developing/quenching agent is selected from derivatives such as a phenol derivative, a salicylic derivative, and a urea derivative; for the layers 34M, 34C, and 34Y, the color developing/quenching agents corresponding to the respective coloring compounds used for the layers are selected. As described above, the photothermal conversion material is selected from dyes such as the phthalocyanine-based dye, the cyanine-based dye, a metal complex dye, and a diimmonium-based dye; for the layers 34M, 34C, and 34Y, the photothermal conversion materials absorbing light in different wavelength regions to generate heat are used.

Specifically, the layer 34M includes, for example, a coloring compound that develops a magenta color, a color developing/quenching agent corresponding to the coloring compound, and a photothermal conversion material that absorbs an infrared ray of a wavelength $\lambda_1$, for example, to be colored. The layer 34C includes, for example, a coloring compound to be colored in a cyan color, a color developing/quenching agent corresponding to the coloring compound, and a photothermal conversion material that absorbs an infrared ray of a wavelength $\lambda_2$, for example, to generate heat. The layer 34Y includes, for example, a coloring compound to be colored in a yellow color, a color developing/quenching agent corresponding to the coloring compound, and a photothermal conversion material that absorbs an infrared ray of a wavelength $\lambda_3$, for example, to generate heat. This allows for obtainment of a display medium that enables full-color display.

It is to be noted that it is preferable to select, for the photothermal conversion material, a combination of materials having narrow photoabsorption bands that do not overlap one another in a wavelength in a range from 700 nm to 2,000 nm, for example. In addition, it is preferable to select materials that do not overlap the photothermal conversion material used in the first layer 13, either, in term of the photoabsorption bands. This makes it possible to selectively color or decolor a desired layer of the first layer 13, the layer 34M, the layer 34C, and the layer 34Y.

The layer 34M, the layer 34C, and the layer 34Y each have a thickness preferably in a range from 1 μm to 20 μm, for example, and more preferably in a range from 2 μm to 15 μm, for example. One reason for this is that, when the layers 34M, 34C, and 34Y each have a thickness less than 1 μm, there is a possibility that sufficient color development density may not be obtained. Further, another reason for this is that, when the layers 34M, 34C, and 34Y each have a thickness more than 20 μm, there is a possibility that a color-developing property and a decoloring property may be deteriorated due to larger amount of heat utilization of each of the layers 34M, 34C, and 34Y.

Further, similarly to the above-described recording layer 12, the layer 34M, the layer 34C, and the layer 34Y each include, in addition to the above-mentioned materials, various additives such as a sensitizer and an ultraviolet absorbing agent, for example.

Similarly to the foregoing first embodiment, the heat-insulating layers 35, 35, and 37 are each configured, for example, using a typical macromolecular material having translucency. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, polyvinyl alcohol, modified polyvinyl alcohol, hydroxy ethyl cellulose, carboxymethyl cellulose, and starch. It is to be noted that the heat-insulating layers 35, 35, and 37 may each include various additives such as an ultraviolet absorbing agent, for example.

Further, the heat-insulating layers 35, 35, and 37 may be each formed using an inorganic material having translucency. For example, use of porous silica, porous alumina, porous titania, porous carbon, a composite thereof, or the like brings preferable effects such as lower thermal conductivity as well as a higher heat-insulating effect. The heat-insulating layers 35, 35, and 37 may be formed by a sol-gel method, for example.

The heat-insulating layers 35, 35, and 37 each have a thickness preferably in a range from 3 μm to 100 μm, for example, and more preferably in a range from 5 μm to 50 μm, for example. One reason for this is that, when the heat-insulating layers 35, 35, and 37 each have a too small thickness, a sufficient heat-insulating effect is not obtained, and, when having a too large thickness, thermal conductivity is deteriorated and translucency is lowered upon uniformly heating the entire reversible recording medium 3.

(3-2. Recording and Deletion Methods of Reversible Recording Medium)

It is possible for the reversible recording medium 3 according to the present embodiment to perform recording and deletion as follows, for example. It is to be noted that description is given here of the recording layer 32 by exemplifying a case where the first layer 13 to be colored in a white color, the layer 34M to be colored in a magenta color, the layer 34C to be colored in a cyan color, and the layer 34Y to be colored in a yellow color are stacked. It is to be noted that the first layer 13 to be colored in a white color is presumed to include a photothermal conversion material that absorbs an infrared ray of a wavelength $\lambda_4$ to be colored.

First, heating is performed at a temperature enough to cause the recording layer 32 (the first layer 13 and the second layer 34 (the layer 34M, the layer 34C, and the layer 34Y)) to be decolored, e.g., at a temperature of 120° C., and causes the recording layer 32 to be in a decolored state in advance. Next, an arbitrary part of the recording layer 32 is irradiated with an infrared ray having a wavelength and an output that are arbitrarily selected using, for example, a semiconductor laser, etc. Here, in a case where the layer 34M is caused to develop a color, irradiation is performed with the infrared ray of the wavelength $\lambda_1$ at energy enough to cause the layer 34M to reach a color-developing temperature. This allows for heat generation of the photothermal conversion material included in the layer 34M, causing a coloring reaction (chromogenic reaction) between the coloring compound and the color developing/quenching agent, thus allowing the irradiated part to develop the cyan color.

Likewise, in a case where the layer 34C is caused to develop a color, irradiation is performed with the infrared ray of the wavelength $\lambda_2$ at energy enough to cause the layer 34C to reach a color-developing temperature. In a case where the layer 34Y is caused to develop a color, irradiation is performed with the infrared ray of the wavelength $\lambda_3$ at energy enough to cause the layer 34Y to reach a color-developing temperature. In a case where the first layer 13 is caused to develop a color, irradiation is performed with the infrared ray of the wavelength $\lambda_4$ at energy enough to cause the first layer 13 to reach a color-developing temperature. This allows for heat generation of each of the photothermal conversion materials included in the layer 34C, the layer 34Y, and the first layer 13, causing a coloring reaction between the coloring compound and the color developing/quenching agent, thus allowing the respective irradiated parts to develop the magenta color and the yellow color or the white color. In this manner, the irradiation of the respective arbitrary parts with the infrared rays of the corresponding wavelengths makes it possible to record information (e.g., a full-color image).

Meanwhile, in a case where the first layer 13, the layer 34M, the layer 34C, and the layer 34Y subjected to the color development as described above are each decolored, irradiation is performed with the infrared rays of the respective wavelengths corresponding to the layers 13, 34M, 34C, and 34Y at energy enough to cause the layers to reach a decoloring temperature. This allows for heat generation of each of the photothermal conversion materials included in the first layer 13, the layer 34M, the layer 34C, and the layer 34Y, causing a decoloring reaction between the coloring compound and the color developing/quenching agent, thus allowing the irradiated part to be decolored and leading to deletion of a record. Further, in a case of deleting all of records formed in the recording layer 32 all at once, the recording layer 32 is heated at a temperature enough to decolor all of the first layer 13, the layer 34M, the layer 34C, and the layer 34Y, e.g., at 120° C. This allows information recorded in the recording layer 32 to be deleted all at once. Thereafter, the above-described operation is performed, thus enabling repeated recording into the recording layer 32.

(3-3. Workings and Effects)

In the reversible recording medium 3 according to the present embodiment, as the second layer 34, for example, the three layers (the layer 34M, the layer 34C, and the layer 34Y) are formed, which include the coloring compounds to be colored in the yellow color, the magenta color, and the cyan color; the respective corresponding color developing/quenching agents; and the photothermal conversion materials having different absorption wavelengths, and the three layers are stacked on the first layer 13. This makes it possible to provide a reversible recording medium having a wide displayable color gamut and enabling full-color recording, in addition to the effects in the foregoing first embodiment.

4. Modification Example 2

The foregoing second embodiment gives an example of providing a multilayer structure in which, as the second layer 34 of the recording layer 32, the layers (the layer 34M, the layer 34C, and the layer 34Y) to be colored in different colors are formed, with the layers being stacked. However, for example, even a single-layer structure allows for achievement of a reversible recording medium that enables full-color display FIG. 5 illustrates a second layer 44, of a recording layer 42, that is formed, for example, by mixing produced three types of microcapsules 44C, 44M, and 44Y including respective coloring compounds to be colored in different colors (e.g., cyan color (C), magenta color (M), and yellow color (Y)), respective color developing/quenching agents corresponding to the coloring compounds, and respective photothermal conversion materials that absorb light in different wavelength regions to generate heat. The second layer 44 may be formed, for example, by dispersing the above-described microcapsules 44C, 44M, and 44Y in a macromolecular material exemplified as the constituent material of the above-described second layer 14 and applying the resultant dispersion onto the support base 11. It is to be noted that, for example, the material that configures the above-described heat-insulating layer 15 is preferably used as the microcapsule that incorporates the above-described materials.

5. Application Examples

Next, description is given of application examples of the reversible recording medium (the reversible recording media 1 to 4) described in the foregoing first and second embodiments and Modification Examples 1 and 2. However, a configuration of an electronic apparatus described below is merely exemplary, and the configuration may be varied appropriately. Any of the above-described reversible recording media 1 to 4 is applicable to a portion of various electronic apparatuses or various clothing accessories, e.g., a portion of clothing accessories such as a watch (wristwatch), a bag, clothes, a hat, glasses, and shoes, as a so-called wearable terminal; the type of the electronic apparatuses, etc. is not particularly limited. In addition, it is also possible to apply, not only to the electronic apparatuses or the clothing accessories, but also to, as an exterior member, an interior or an exterior such as a wall, etc. of a building, an exterior of furniture such as a desk, and the like.

Application Example 1

FIGS. 6A and 6B each illustrate an appearance of an integrated circuit (IC) card with a rewritable function. The IC card has a card surface that serves as a printing surface 110, and includes, for example, a sheet-shaped reversible recording medium 1, etc. that is adhered thereto. The IC card allows for drawing on the printing surface as well as rewriting and deletion thereof appropriately by disposing the reversible recording medium 1, etc. on the printing surface 110, as illustrated in FIGS. 6A and 6B.

Application Example 2

FIG. 7A illustrates a configuration of an appearance of a front surface of a smartphone, and FIG. 7B illustrates a configuration of an appearance of a rear surface of the smartphone illustrated in FIG. 7A. The smartphone includes, for example, a display part 210, a non-display part 220, and a casing 230. An entire surface, for example, of the casing 230 on side of the rear surface is provided with, for example, the reversible recording medium 1, etc. as the exterior member of the casing 230. This allows for display of various color patterns as illustrated in FIG. 7B. It is to be noted that, although the smartphone is exemplified here, this is not limitative; it is also possible to apply, for example, to a notebook personal computer (PC), a tablet PC, or the like.

Application Example 3

FIGS. 8A and 8B each illustrate an appearance of a bag. The bag includes a storing part 310 and a handle 320, for example, and the reversible recording medium 1, for example, is attached to the storing part 310. Various letters and patterns are displayed on the storing part 310 by means of the reversible recording medium 1, for example. The attachment of the reversible recording medium 1, etc. to a part of the handle 320 allows for display of various color patterns, and allows for change in design of the storing part 310, as illustrated, from the example of FIG. 8A to the example of FIG. 8B. It is also possible, for the purpose of fashion, to achieve a useful electronic device.

Application Example 4

FIG. 9 illustrates a configuration example of a wristband able to record, in an amusement park, attraction-riding history, schedule information, and the like, for example. The wristband includes belt parts 411 and 412 and an information recording part 420. The belt parts 411 and 412 have a band shape, for example, and respective ends (unillustrated) thereof are configured to be connectable to each other. The reversible recording medium 1, etc., for example, is adhered to the information recording part 420, and attraction-riding history MH2 and schedule information IS (IS1 to IS3) as described above and an information code CD, for example, are recorded. In the amusement park, a visitor is able to record the above-described information by waving the wristband over a drawing apparatus installed at every location of attraction-riding reservation spots.

A riding history mark MH1 indicates the number of attractions ridden by a visitor who wears the wristband in the amusement park. In this example, as the visitor rides the more attractions, the more star-shaped marks are recorded as the riding history mark MH1. It is to be noted that this is not limitative; for example, the color of the mark may be changed in accordance with the number of attractions ridden by the visitor.

The schedule information IS in this example indicates a schedule of the visitor. In this example, information about all of events including an event reserved by the visitor and an event to be held in the amusement park is recorded as the schedule information IS1 to IS3. Specifically, in this example, a title of an attraction (an attraction 201) of which riding reserved by the visitor and scheduled time of the riding are recorded as the schedule information IS1. Further, an event such as a parade in the park and its scheduled starting time are recorded as the schedule information IS2. Furthermore, a restaurant reserved beforehand by a visitor 5 and its scheduled mealtime are recorded as the schedule information IS3.

The information code CD records, for example, identification information IID that is used to identify the wristband and website information IWS.

6. Working Examples

Next, description is given in detail of Working Examples of the present disclosure.

Ten types of reversible recording media (Experimental Examples 1 to 10) each having the configuration exemplified in the foregoing second embodiment were produced as samples to evaluate their respective optical properties.

Experimental Example 1

First, a reversible recording medium coating A for a first layer (white layer) was prepared to form the first layer. 26 parts by weight of a vinyl chloride-based copolymer (M110 available from Zeon Corporation) was dissolved in 210 parts by mass of a solvent (methyl ethyl ketone (MEK)). 6 parts by weight of behenic acid and 4 parts by weight of eicosane diacid were added to the resultant, and ceramic beads each having a diameter of 1 mm were placed into the glass bottle, followed by dispersion for 2 hours using a rocking mill to prepare a homogeneous liquid. Subsequently, 0.1 parts by mass of a photothermal conversion material (IR-915 available from Nippon Shokubai Co., Ltd.) and 4 parts by mass of an isocyanate compound (Coronate 2298-90T available from Nippon Polyurethane Industry Co., Ltd.) were added to the resulting dispersion liquid to prepare the reversible recording medium coating A.

Next, the reversible recording medium coating A was applied onto a white support base, and heated and dried. Thereafter, the resultant was further kept for 24 hours in an environment of 65° C. to cause resin to undergo crosslinking. This allowed the first layer having a thickness of 10 μm to be provided. Absorbance of the first layer for light of a wavelength of 980 nm was 0.2.

Subsequently, an aqueous polyvinyl alcohol solution was applied onto the first layer and dried to form a heat-insulating layer having a film thickness of 20 μm.

Next, a reversible recording medium coating B1 for a second layer, i.e., a magenta layer was prepared to form the magenta layer. First, 0.23 g of a leuco pigment (RED-DCF) represented by the following formula (3), 0.4 g of a color developing/quenching agent (alkyl salicylate) represented by the following formula (4), 0.01 g of a phthalocyanine-based photothermal conversion material A, and 0.8 g of a polymer (MB1008, poly(vinyl chloride-co-vinyl acetate (9:1))) were added to 8.8 g of a solvent (methyl ethyl ketone (MEK)), and the resultant was dispersed for 2 hours using a rocking mill to prepare a homogeneous dispersion liquid (coating A). The coating A was applied onto a support substrate using a wire bar, and was subjected to heating and drying treatments at 70° C. for 5 minutes to form the magenta layer having a thickness of 3 μm. The photothermal conversion material included in the magenta layer had an absorbance of 0.16 for light of a wavelength of 915 nm. The absorbance of the magenta layer was determined by performing integrating sphere measurement using an ultraviolet-visible near infrared spectrophotometer V-770 (available from JASCO Corporation) on the magenta layer formed on a transparent polyethylene terephthalate substrate having a thickness of 50 μm and by subtracting absorption by the substrate, etc.

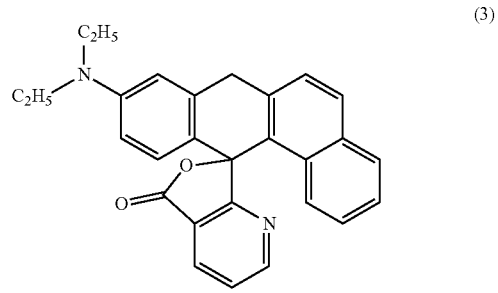

(3)

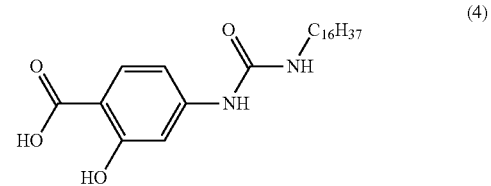

(4)

Subsequently, an aqueous polyvinyl alcohol solution was applied onto the magenta layer, and the resultant was dried to form a heat-insulating layer having a film thickness of 20 μm.

Next, a reversible recording medium coating B2 for a second layer, i.e., a cyan layer was prepared to form the cyan layer. First, 0.2 g of a leuco pigment (H3035) represented by the following formula (5), 0.4 g of the color developing/quenching agent (alkyl salicylate) represented by the above formula (4), 0.01 g of a phthalocyanine-based photothermal conversion material B, and 0.8 g of the polymer (MB1008, poly(vinyl chloride-co-vinyl acetate (9:1))) were added to 8.8 g of the solvent (methyl ethyl ketone (MEK)), and the resultant was dispersed for 2 hours using a rocking mill to prepare a homogeneous dispersion liquid (coating B). The coating B was applied onto a support substrate using a wire bar, and was subjected to heating and drying treatments at 70° C. for 5 minutes to form the cyan layer having a thickness of 3 μm. A method similar to that as described above was used to measure absorbance of the photothermal conversion material included in the cyan layer for light of a wavelength of 860 nm to find that a value of the absorbance was 0.2.

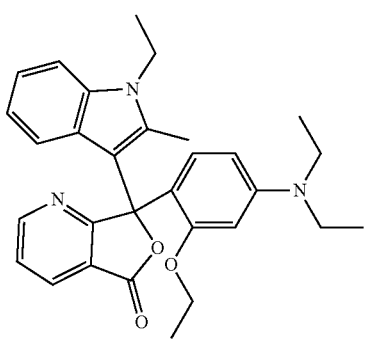

(5)

Subsequently, an aqueous polyvinyl alcohol solution was applied onto the cyan layer, and the resultant was dried to form a heat-insulating layer having a film thickness of 20 μm.

Next, a reversible recording medium coating B3 for a second layer, i.e., a yellow layer was prepared to form the yellow layer. First, 0.15 g of a leuco pigment (TPY-7) represented by the following formula (6), 0.4 g of the color developing/quenching agent (alkyl salicylate) represented by the above formula (4), 0.01 g of a phthalocyanine-based photothermal conversion material C, and 0.8 g of the polymer (MB1008, poly(vinyl chloride-co-vinyl acetate (9:1))) were added to 8.8 g of the solvent (methyl ethyl ketone (MEK)), and the resultant was dispersed for 2 hours using a rocking mill to prepare a homogeneous dispersion liquid (coating C). The coating C was applied onto a support substrate using a wire bar, and was subjected to heating and drying treatments at 70° C. for 5 minutes to form the yellow layer having a thickness of 5 μm. A method similar to that as described above was used to measure absorbance of the photothermal conversion material included in the yellow layer for light of a wavelength of 760 nm to find that a value of the absorbance was 0.22.

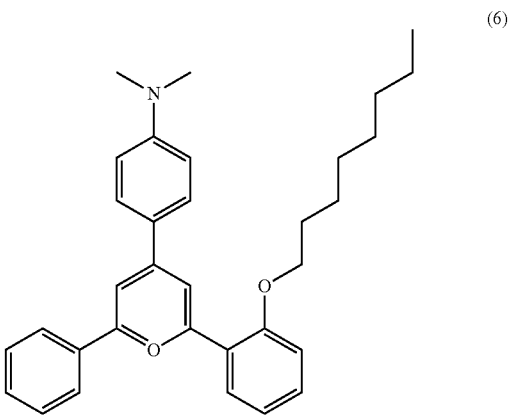

(6)

Lastly, an ultraviolet curable resin was used on the cyan layer to form a protective layer having a thickness of about 2 μm, thus producing a reversible multicolor recording medium (Experimental Example 1).

Experimental Example 2

In Experimental Example 2, a polyethylene terephthalate substrate colored in a silver color was used as the support base; except for this, a method similar to that of Experimental Example 1 was used to produce a reversible multicolor recording medium (Experimental Example 2).

Experimental Example 3

In Experimental Example 3, a polyethylene terephthalate substrate colored in a red color was used as the support base; except for this, a method similar to that of Experimental Example 1 was used to produce a reversible multicolor recording medium (Experimental Example 3).

Experimental Example 4

In Experimental Example 4, a polyethylene terephthalate substrate colored in a blue color was used as the support base; except for this, a method similar to that of Experimental Example 1 was used to produce a reversible multicolor recording medium (Experimental Example 4).

Experimental Example 5

In Experimental Example 5, a polyethylene terephthalate substrate colored in a black color was used as the support base; except for this, a method similar to that of Experimental Example 1 was used to produce a reversible multicolor recording medium (Experimental Example 5).

Experimental Example 6

In Experimental Example 6, the first layer (white layer) and the heat-insulating layer on the white layer were omitted; except for this, a method similar to that of Experimental Example 1 was used to produce a reversible multicolor recording medium (Experimental Example 6).

Experimental Example 7

In Experimental Example 7, the first layer (white layer) and the heat-insulating layer on the white layer were omitted; except for this, a method similar to that of Experimental Example 2 was used to produce a reversible multicolor recording medium (Experimental Example 7).

Experimental Example 8

In Experimental Example 8, the first layer (white layer) and the heat-insulating layer on the white layer were omitted; except for this, a method similar to that of Experimental Example 3 was used to produce a reversible multicolor recording medium (Experimental Example 8).

Experimental Example 9

In Experimental Example 9, the first layer (white layer) and the heat-insulating layer on the white layer were omitted; except for this, a method similar to that of Experimental Example 4 was used to produce a reversible multicolor recording medium (Experimental Example 9).

Experimental Example 10

In Experimental Example 10, the first layer (white layer) and the heat-insulating layer on the white layer were omitted; except for this, a method similar to that of Experimental Example 5 was used to produce a reversible multicolor recording medium (Experimental Example 10).
(Evaluation Method of Optical Properties)

First, reflection density (O.D.) of the support base and reflection density of each layer after color development of the reversible multicolor recording medium were measured. The measurement of the reflection density was performed using eXact available from X-Rite Inc. The same instrument was used also for measurement of chromaticity in each of the states to calculate L*a*b*. Next, as for each of layers configuring the reversible multicolor recording medium, absorbance of each single layer for wavelengths of recording laser light was measured. Further, an absorption curve was measured using a spectrophotometer. As a result, it was appreciated that absorbance of each single layer in the wavelengths of the recording laser light for each layer was in a range from 0.2 to 0.22. It is to be noted that, for evaluation of the absorption curve, each layer was formed on an absorbance-measuring transparent PET film.

white layer to be transparent made it possible to express a color tone of the support base. In contrast, in Experimental Examples 7 to 10 in which the white layer was not provided, the color tone of the support base served as a reflective layer, making it not possible to reproduce respective color tones of the leuco pigments used for the magenta layer, the cyan layer, and the yellow layer.

It is appreciated, from the above, that providing, on the support base, the first layer (white layer) that allows for reversible change between a white color state and a transparent state and providing, on the white layer, a layer that allows for reversible change between a colored state and a transparent state made it possible to control the color tone of the support base, the white color, and the color tone of the colored layer independently of one another and thus to cause them to develop a color.

Although the present disclosure has been described above with reference to the first and second embodiments, Modification Examples 1 and 2, and Working Examples, the present disclosure is not limited to aspects described in the foregoing embodiments, etc., and may be modified in a variety of ways. For example, not all the components described in the foregoing embodiments, etc. may necessarily be provided, and any other component may be further included. Moreover, the materials and the thicknesses of the above-described components are merely examples, and are not limited to those described herein.

Further, although the foregoing Modification Example 2 gives an example where the microcapsule is used to perform full-color display in the single-layer structure, this is not limitative; for example, it is also possible to use a fiber-shaped three-dimensional stereoscopic structure to perform the full-color display. For example, the fiber to be used here preferably has a so-called core-sheath structure configured by a core part that includes the coloring compound to be colored in a desired color, the color developing/quenching agent corresponding thereto, and the photothermal conversion material, and by a sheath part that coats the core part and is configured by a heat-insulating material. By forming the three-dimensional stereoscopic structure using a plurality of types of fibers having the core-sheath structure and including respective coloring compounds to be colored in

TABLE 1

| Experimental Example | White Layer | | | | Magenta Layer (Recording with 915 nm Laser) | | | | Cyan Layer (Recording with 860 nm Laser) | | | | Yellow Layer (Recording with 800 nm Laser) | | | |
|---|---|---|---|---|---|---|---|---|---|---|---|---|---|---|---|---|
| | Reflection Density | L* | a* | b* | Reflection Density | L* | a* | b* | Reflection Density | L* | a* | b* | Reflection Density | L* | a* | b* |
| 1 | 0.32 | 79.2 | −3.8 | −1.1 | 1.54 | 44.5 | 77.2 | −5.4 | 1.52 | 53.6 | −39.1 | −46.2 | 1.18 | 80.1 | 6.2 | 88.2 |
| 2 | 0.33 | 79 | −3.7 | −1.6 | 1.51 | 44.2 | 75.8 | −5.3 | 1.5 | 53.3 | −38.6 | −46.1 | 1.16 | 79.6 | 5.3 | 86.8 |
| 3 | 0.33 | 78.8 | −3.5 | −1.4 | 1.5 | 43.3 | 76.6 | −5.2 | 1.49 | 53 | −38 | −45.9 | 1.18 | 80.2 | 5.8 | 87.2 |
| 4 | 0.31 | 79.3 | −3.6 | −1.5 | 1.52 | 43.7 | 76.8 | −5.6 | 1.49 | 53.1 | −38.5 | −46 | 1.17 | 79.7 | 5.5 | 87.5 |
| 5 | 0.34 | 78.2 | −3.4 | −1.6 | 1.5 | 42.9 | 77.5 | −5.5 | 1.47 | 52.8 | −38.2 | −45.5 | 1.15 | 79.5 | 5.8 | 87.6 |
| 6 | 0.21 | 85.5 | −1.9 | −4.8 | 1.65 | 49.2 | 79.9 | −5.9 | 1.55 | 58.6 | −40.3 | −47.5 | 1.22 | 82.4 | 6.9 | 89.7 |
| 7 | 0.46 | 65.7 | −3.2 | −4.1 | 2.43 | 23.2 | 53.6 | −7.3 | 2.4 | 27.4 | −30.8 | −28.9 | 1.69 | 53.4 | −1.5 | 66.9 |
| 8 | 1.4 | 39.7 | 44.4 | 17.4 | 2.54 | 28.6 | 65.34 | 41.4 | 2.41 | 5.18 | −4.01 | −8.72 | 2.42 | 36.3 | 60.4 | 57.7 |
| 9 | 1.16 | 42.3 | −8.9 | −36.9 | 2.32 | 9.7 | 43.9 | −43.4 | 2.42 | 25.7 | −15.23 | −48.6 | 1.5 | 33.1 | −26.9 | 24.9 |
| 10 | 1.2 | 30.5 | −2.3 | −4.6 | 2.11 | 8.32 | 29.2 | −2.2 | 2.22 | 9.2 | −15.89 | −14 | 1.98 | 22.5 | −1.6 | 30.9 |

Table 1 lists results of optical properties in Experimental Examples 1 to 10. In Experimental Examples 1 to 6, all of the magenta layer, the cyan layer, and the yellow layer obtained L*a*b* corresponding to the respective layers regardless of colors of the support base. Further, causing the different colors, it becomes possible to produce a reversible recording medium that enables full-color display.

Furthermore, although the foregoing embodiments, etc. give an example where the laser is used to perform color development and decoloring of recording layers, this is not limitative. For example, a thermal head may also be used to perform the color development and the decoloring.

It is to be noted that the effects described in the present specification are merely exemplary and not limitative, and may have other effects.

It is to be noted that the present disclosure may have the following configurations.

(1)
A reversible recording medium including:
a first layer that reversibly changes between an achromatic state and a transparent state; and
a second layer that reversibly changes between a chromatic state and a transparent state.

(2)
The reversible recording medium according to (1) or (2), in which the first layer has an optical reflectance of 30% or higher in the achromatic state.

(3)
The reversible recording medium according to any one of (1) to ( ) in which the first layer has an optical reflectance of 70% or higher in the transparent state.

(4)
The reversible recording medium according to any one of (1) to (3), in which the first layer and the second layer are stacked on each other.

(5)
The reversible recording medium according to any one of (1) to (4), in which
the second layer includes a plurality of layers having different color hues in the chromatic state, and
the plurality of layers are disposed on same plane.

(6)
The reversible recording medium according to any one of (1) to (5), in which
the second layer includes a plurality of layers having different color hues in the chromatic state, and
the plurality of layers are stacked on each other.

(7)
The reversible recording medium according to any one of (1) to (6), including a support base material, in which
the first layer and the second layer are stacked in this order on the support base material.

(8)
The reversible recording medium according to any one of (1) to (7), in which the first layer includes
a macromolecular matrix material, and
an organic low molecular compound having a molecular weight in a range from 150 to 700.

(9)
The reversible recording medium according to (8), in which the first layer further includes a photothermal conversion agent.

(10)
The reversible recording medium according to any one of (1) to (9), in which the second layer includes
a coloring compound having an electron-donating property, and an electron-accepting compound.

(11)
The reversible recording medium according to (10), in which the second layer further includes the photothermal conversion agent.

(12)
The reversible recording medium according to any one of (1) to (11), in which the change of the first layer between the achromatic state and the transparent state and the change of the second layer between the chromatic state and the transparent state occur at different temperatures.

(13)
An exterior member having at least one surface provided with a reversible recording medium on a support base material,
the reversible recording medium including, as a recording layer that reversibly changes between a recorded state and a deleted state:
a first layer that reversibly changes between an achromatic state and a transparent state; and
a second layer that reversibly changes between a chromatic state and a transparent state.

This application claims the benefit of Japanese Priority Patent Application JP2016-225534 filed with the Japan Patent Office on Nov. 18, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A reversible recording medium comprising:
a first layer that reversibly changes between an achromatic state and a transparent state; and
a second layer that reversibly changes between a chromatic state and a transparent state.

2. The reversible recording medium according to claim 1, wherein the first layer has an optical reflectance of 30% or higher in the achromatic state.

3. The reversible recording medium according to claim 1, wherein the first layer has an optical reflectance of 70% or higher in the transparent state.

4. The reversible recording medium according to claim 1, wherein the first layer and the second layer are stacked on each other.

5. The reversible recording medium according to claim 1, wherein
the second layer includes a plurality of layers having different color hues in the chromatic state, and
the plurality of layers are disposed on the same plane.

6. The reversible recording medium according to claim 1, wherein
the second layer includes a plurality of layers having different color hues in the chromatic state, and
the plurality of layers are stacked on each other.

7. The reversible recording medium according to claim 1, comprising a support base material, wherein
the first layer is disposed on the support base material and the second layer is disposed on the first layer.

8. The reversible recording medium according to claim 1, wherein the first layer comprises
a macromolecular matrix material, and
an organic low molecular weight compound having a molecular weight in a range from 150 to 700.

9. The reversible recording medium according to claim 1, wherein the first layer comprises a photothermal conversion agent.

10. The reversible recording medium according to claim 1, wherein the second layer comprises
a coloring compound having an electron-donating property, and
an electron-accepting compound.

11. The reversible recording medium according to claim 1, wherein the second layer comprises a photothermal conversion agent.

12. The reversible recording medium according to claim 1, wherein the change of the first layer between the achromatic state and the transparent state and the change of the second layer between the chromatic state and the transparent state occur at different temperatures.

13. An exterior member having at least one surface provided with a reversible recording medium on a support base material,
the reversible recording medium comprising, as a recording layer that reversibly changes between a recorded state and a deleted state:
a first layer that reversibly changes between an achromatic state and a transparent state; and a second layer that reversibly changes between a chromatic state and a transparent state.

14. The reversible recording medium according to claim 1, wherein the first layer in the achromatic state has a white color.

15. The reversible recording medium according to claim 1, wherein the first layer comprises a first fatty acid.

16. The reversible recording medium according to claim 15, wherein the first layer further comprises a second fatty acid, wherein the first fatty acid has a first melting point and the second fatty acid has a second melting point different from the first melting point.

17. The reversible recording medium according to claim 1, wherein the first layer comprises a first photothermal conversion agent and the second layer comprises a second photothermal conversion agent, wherein the first photothermal conversion agent and/or the second photothermal conversion agent have an absorption peak in a wavelength range from 700 nm to 2000 nm.

18. The reversible recording medium according to claim 1, wherein the second layer comprises one or more leuco pigments.

19. The reversible recording medium according to claim 1, wherein the second layer comprises a color developing/quenching agent comprising a phenol derivative, a salicylic acid derivative, and/or a urea derivative.

20. The reversible recording medium according to claim 1, further comprising a heat-insulating layer positioned between the first layer and the second layer.

* * * * *